United States Patent
Talyansky et al.

(10) Patent No.: US 6,678,794 B1
(45) Date of Patent: Jan. 13, 2004

(54) SMOOTHING BURSTS OF DISK LOAD IN A FILE SYSTEM

(75) Inventors: Roman Talyansky, Haifa (IL); Boaz Shmueli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 09/593,411

(22) Filed: Jun. 14, 2000

(51) Int. Cl.[7] ............................................. G06F 12/06
(52) U.S. Cl. ........................ 711/135; 711/113; 711/170; 710/56; 707/202
(58) Field of Search .................. 711/113, 134, 711/135, 170, 171, 172, 137; 707/202, 206; 710/310, 56, 57, 52

(56) References Cited

U.S. PATENT DOCUMENTS

| | | | | |
|---|---|---|---|---|
| 5,551,003 A | * | 8/1996 | Mattson et al. | 711/136 |
| 5,572,645 A | * | 11/1996 | Dan et al. | 345/501 |
| 5,892,937 A | * | 4/1999 | Caccavale | 711/135 |
| 5,963,962 A | * | 10/1999 | Hitz et al. | 707/202 |
| 6,490,647 B1 | * | 12/2002 | Batchelor et al. | 710/310 |

* cited by examiner

*Primary Examiner*—Matthew Kim
*Assistant Examiner*—Pierre-Michel Bataille
(74) *Attorney, Agent, or Firm*—Darby & Darby

(57) ABSTRACT

A technique for asynchronous computer disk cache management reduces the burstiness of disk I/O. It provides a periodic sync process to flush modified buffers, wherein only buffers exceeding a threshold age are selected to be flushed. In one variant the sync process only executes when the number of modified buffers in the cache exceeds a threshold, which can be dynamically adapted to changing patterns of cache usage. The age of the dirty buffers is measured by sync periods to minimize time computation. In some embodiments an additional cleaning process flushes old buffers between sync invocations.

24 Claims, 2 Drawing Sheets

SMOOTHING BURSTS OF DISK LOAD IN A FILE SYSTEM

BACKGROUND OF THE INVENTION

1. Field of the Invention

This invention relates to a computer cache memory management system. More particularly this invention relates to a technique of smoothing disk load in a computer cache management system that employs asynchronous write requests.

2. Description of the Related Art

From time to time during execution of computer applications, requests are made to the computer's file system to write or read data to or from computer files, which incurs disk input/output ("I/O"). Generally computer file systems partition disk space in working units known as blocks, which are variously assigned to files. A write request may be either synchronous or asynchronous. On receipt of a synchronous write request by an application, the file system immediately writes file data to disk blocks, and the requesting application is required to wait until the modification to the file arrives at the disk.

It is a drawback of using synchronous requests that if an application makes frequent requests for the file system to write to the same disk blocks, the application will be considerably slowed by the need for the application to wait during the pendency of each successive write request. Consequently it is common for file systems to utilize asynchronous write requests, in which the data is initially brought from the disk into an internal memory or cache buffer. Subsequent write requests are directed to the cache buffer, rather than directly to the disk. Typically a cache buffer stores the contents of one disk block, or a part thereof. On an asynchronous write request, in which the disk block is to be modified, the cache buffer is modified, and flagged accordingly. Such modified cache buffers are termed "dirty". Unmodified cache buffers are termed "clean". Once the cache buffer has been flagged as dirty, it, rather than the disk block, contains the most up-to-date information. With this approach, instead of awaiting completion of a sequence of relatively slow disk I/O operations, the application at most only waits for one I/O operation, during which the disk block is fetched into the cache. If the block is already resident in the cache, then even this I/O operation is avoided. Subsequent write requests only produce accesses to the cache, which are much more rapid than disk accesses.

Caching disk blocks may be helpful also for read requests. Consider, for example, a read access pattern, in which there are multiple requests to read the same block during a short time interval. If the block is read from disk and transferred to a buffer, only the first read request of the block will cause an I/O operation. All the subsequent requests will be served much faster than the first one, due to presence of the block's contents in the cache.

A weakness of using asynchronous requests is that modifications to files are stored in memory buffers and on a system crash they are lost. Ideally, to prevent information loss, all the dirty cached buffers should be written to the disk just prior to the crash. However, it is generally impractical to predict a crash. In order to protect the buffered information against being lost, a file system may run a sync process or daemon, such as the known daemon syncd. This process periodically writes, or flushes, the contents of all dirty buffers back onto the disk. Immediately following the flushing operation, the contents of the cache buffer and the corresponding block of the disk are identical. Later, as a result of new write requests, the flushed buffers in the cache are again modified, and they, rather than the disk blocks, contain the last modifications of the files.

Typically the daemon syncd is coded as an infinite loop, which consists of calling a function sync. The function sync flushes all the cached dirty buffers, followed by a sleep of some period of time. As used herein the term "sync" means an invocation of the function sync by the daemon syncd or a similar daemon.

There are a number of difficulties associated with prior art implementations of the daemon syncd, the amelioration of which are the concern of the present invention. It may be noted that the daemon syncd does not guarantee full protection of buffered data in the cache against a system crash. Indeed, if a system crash happens while the daemon syncd is sleeping, modifications made since the last sync are lost. To overcome this difficulty a file system may also provide a synchronous write operation, as there is a class of write requests which must not be lost. For example some updates of internal file system structures must arrive at the disk before the file system can continue operations. Furthermore, an application can explicitly direct the file system to process its write requests synchronously.

As described above, the daemon syncd periodically flushes all dirty buffers to the disk and sleeps the rest of the time. This periodicity of activity on the part of the daemon syncd induces a bursty pattern of disk load. Due to such bursts or disk activity, flushing a dirty buffer may take significantly longer than would be required to write the buffer between such bursts. This delay, in turn, may slow down executing applications in the following manner. While the daemon syncd is flushing buffers associated with a file, various locks on the file's inode, its indirect blocks and other internal file structures may be held. In consequence all other processes which need the resources secured by the locks must wait until the daemon syncd finishes flushing the file and release the locks. Furthermore, all the applications currently asserting synchronous write requests will also be delayed.

Since a cache buffer is typically smaller than the amount of information, written to disk, in practice all the cache buffers quickly become occupied. When this situation prevails, in order to fulfill a request to access a disk block which is not currently buffered, one of the occupied cache buffers must be "stolen". That is to say that one of the cache buffers is chosen and its contents discarded, so that it may serve to cache the newly accessed disk block. It will be apparent that if the chosen buffer chosen is dirty, its contents must be flushed to the disk before it is reused. In this case the application, for which a buffer is requested, must wait for two I/O operations to complete: (a) flushing the dirty buffer and (b) fetching the needed block from disk into the stolen buffer. Ideally, to prevent an application from delaying while a stolen dirty buffer is being flushed, a clean buffer would always be available to satisfy the application's request.

Prior art attempts to improve this situation have involved the notion of fresh buffers. From study of temporal locality in practical computer applications, it is known that once a cache buffer becomes dirty, it has a high probability of being further modified several times during a relatively short subsequent time interval. During this interval it is termed a "fresh" dirty buffer, and afterward it is said to be an "old" dirty buffer. The Linux operating system activates a kernel process, the daemon bdflush, when a percentage of dirty cache buffers exceeds a constant threshold limit, as determined by a parameter nfract. The daemon bdflush appears to recognizes fresh buffers to a limited extent. In a cycle of operation the daemon bdflush flushes up to a maximum number of dirty buffers, regardless of their age, as determined by another parameter ndirty. Linux also imposes a maximum age on dirty buffers, specified by the parameter age_buffer, after which they are flushed by the daemon bdflush.

SUMMARY OF THE INVENTION

It is therefore a primary object of some aspects of the present invention to improve the file management performance of computer operating systems.

It is another object of some aspects of the present invention to improve cache response time in computer operating systems utilizing asynchronous I/O operations.

It is a further object of some aspects of the present invention to spread the disk load incurred by I/O operations of a computer file system over time.

These and other objects of the present invention are attained by improvements in the management of the memory cache in an operating system employing asynchronous write requests and a daemon for flushing the cache that invokes a sync function. Between two successive syncs old buffers are flushed by an ancillary cleaning process until the number of such buffers falls below a threshold limit, and fresh buffers are mostly excluded from flushing by sync.

The invention provides a method for asynchronous computer disk cache management which is performed by initially storing data in buffers of a cache memory to form clean buffers. Subsequently data in the buffers is modified to form dirty buffers, and then a sync process is executed to flush dirty buffers into the storage devices to reconstitute the available buffers, wherein fresh buffers are excluded from the flush procedure.

According to an aspect of the invention the sync process executes periodically.

According to another aspect of the invention the sync process executes responsive to a number of the dirty buffers in the cache.

According to still another aspect of the invention the age of the dirty buffers eligible to be flushed is dynamically varied responsive to cache usage.

In a further aspect of the invention the age of the dirty buffers is measured by sync periods.

Preferably a buffer is characterized as eligible to be flushed if a previous sync execution has failed to operate thereon.

According to an aspect of the invention a cleaning process executes responsive to a number of old buffers in the cache to flush old buffers. The cleaning process is executed between successive executions of the sync process and executes so long as old buffers in the cache exceed a predetermined number.

According to another aspect of the invention the old buffers are selected by the cleaning process using a least recently used algorithm to measure cache usage.

According to yet another aspect of the invention the cleaning process also operates on fresh buffers when a number of dirty buffers in the cache exceeds a threshold.

According to still another aspect of the invention the threshold is dynamically adapted to a current pattern of cache access.

The invention provides a computer software product, comprising a computer-readable medium in which computer program instructions are stored, which instructions, when read by a computer, cause the computer to execute the embodiments of the foregoing method.

The invention provides computer apparatus, having computer program instructions stored therein, which instructions, cause the computer to execute the embodiments of foregoing method.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a through understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Figure 1:
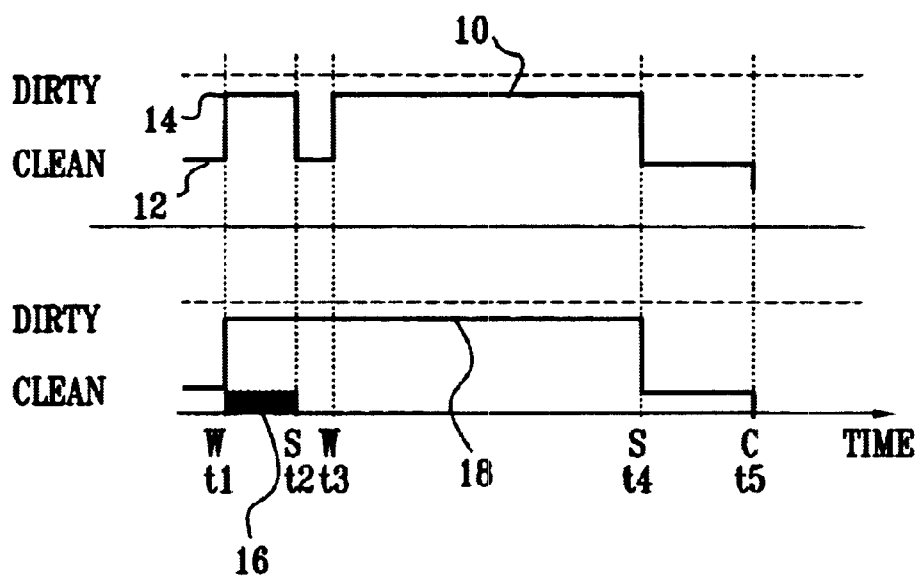
FIG. 1 is a composite timing diagram illustrating a pattern of state transitions of a cache buffer in accordance with a preferred embodiment of the invention.

Turning now to the drawings, and in particular to FIG. 1 thereof, there are shown two timing diagrams of cache buffer operation. The symbol "W" indicates a write operation, and the symbol "C" indicates that the file with which the buffer is associated is closed. A sync is indicated by the symbol "S". The solid line 10 in the upper diagram shows transitions between a clean state 12 and a dirty state 14 of a single cache buffer along a time axis in a conventional file system. The buffer is first written and becomes dirty at the time t1. As the behavior of the application is in accordance with the principles of temporal and spatial locality, the period of time during which the buffer is frequently modified begins at the time t1 and ends at the time t3, as indicated by the wavy line 16. During this period a sync occurs at the time t2. A second sync occurs at the time t4. At the time t5 the file with which the buffer is associated is closed. The buffer is flushed to disk twice by the two noted syncs before the file is closed. It will be understood that unless otherwise specified, reference to flushing of buffers herein, whether old, fresh, or unspecified, are references to dirty buffers.

As shown in the lower diagram flushing the buffer by the first sync at time t2 may be avoided if we modify sync in the following way. Let a fresh buffer be a dirty buffer which is currently being frequently modified and assume there has not been a sync since the buffer began to be frequently modified. According to this modification a fresh buffer is considered to become old if it either ceases to be frequently modified or if it is skipped by a sync. Furthermore sync will not flush fresh buffers. The lower diagram of FIG. 1 shows, on line 18, the same pattern of access as in the upper diagram, but with the sync modification. We now see that the buffer is flushed once only, at time t4. This modification to sync saves one disk access. It will be recalled that there were two disk accesses without the modification. Note again that once a fresh buffer is skipped by sync, it becomes old, and will not be skipped by the next sync.

It is rather hard in practice to identify a useful period of time during which a buffer is being frequently modified. So approximate techniques can be used to find such periods, for example using the least recently used ("LRU") algorithm.

Figure 2:
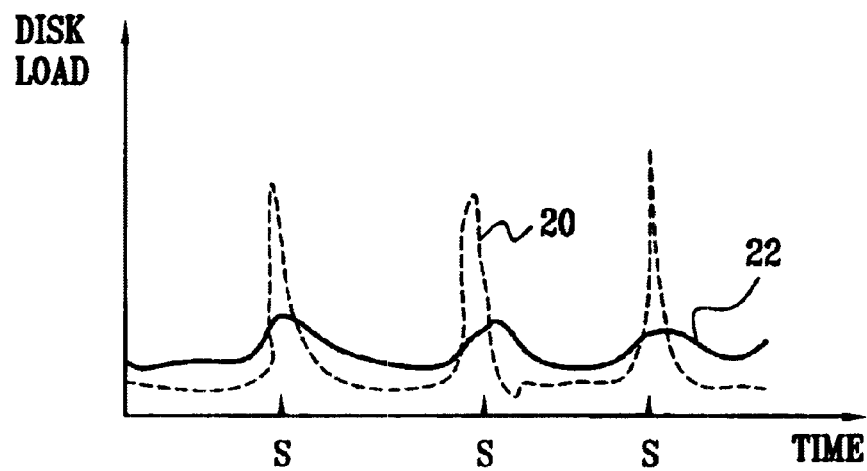
FIG. 2 is a plot comparing a pattern of disk loading according to the invention with a pattern according to the prior art.

To solve the problems of bursty disk load and long cache response time, according to a preferred embodiment of the invention there are two main modifications to prior art techniques: (a) between two successive syncs old buffers are flushed by an ancillary cleaning process until the number of such buffers falls below a threshold limit; and (b) fresh buffers are excluded from flushing by sync. This technique, on one hand, keeps many clean buffers in the cache, and on the other hand, at the time of executing sync, there will not be many old dirty buffers. As a result there will not be a burst of disk load during sync. The difference in disk load, using the inventive technique, can be appreciated with reference to FIG. 2, in which a disk load pattern using prior art methods is shown by the dotted line 20. The smoothed disk load pattern in the same computing environment, but with the inventive modifications, is shown by the solid line 22. In FIG. 2 sync invocations are indicated by "S" along the time axis.

The preferred embodiment of the invention has been implemented using the IBM parallel file system, but is applicable to many other file systems. A cache controller is preferably included in the computer that operates the file system, and it controls the various access operations disclosed herein. All syncs in the file system are enumerated. All the dirty buffers of the cache are represented on a linked list, dirtylist. Whenever a buffer becomes dirty, it is marked or quasi-timestamped with the identifying number of the most recent sync and is inserted into the linked list dirtylist at the tail.

Characterization of a buffer as a fresh buffer is preferably based on its last modification with reference to the sync enumeration, rather than by the use of a timestamp that references a system clock. Increased speed of computation and buffer management is achieved by this technique. For purposes of this embodiment and the alternate embodiments disclosed below, a buffer that becomes dirty between the $(i-1)^{th}$ and the $i^{th}$ sync is fresh within its associated sync period, which is the period beginning immediately following the $(i-1)^{th}$ sync, and ending with the $i^{th}$ sync. After the associated sync period has elapsed, the buffer is considered to be old. Such a buffer is not flushed by the $i^{th}$ sync, but rather by $(i+1)^{th}$ sync, if it has not been flushed before for any other reason. The described behavior is illustrated on FIG. 3 which presents modifications to three buffers, buf1, buf2, and buf3, at several times. At time t1 the three buffers are clean. At time t2 the buffers buf1 and buf2 are dirtied. A sync, indicated by "S", which comes at time t3, does not flush buffers buf1 and buf2, because they are fresh. At time t4 buffer buf3 becomes dirty. At time t5 sync arrives and flushes buffers buf1 and buf2, since they are now old, but does not flush buffer buf3, because it is fresh at the moment.

In a variant of this preferred embodiment other measures of time can be used to identify the age of a cache buffer, for example another periodic event in the computer, such as the output of a counter, or even the system clock. This will result in finer granularity in cache management, but at greater computational expense.

Figure 3:
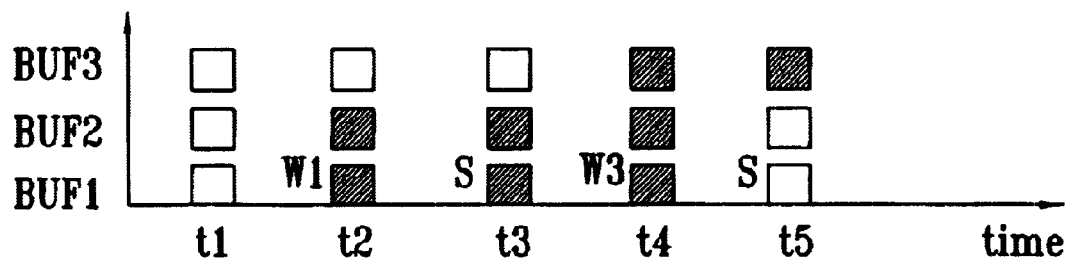
FIG. 3 illustrates sequences of state transitions of a plurality of cache buffers according to a preferred embodiment of the invention.
Figure 4:
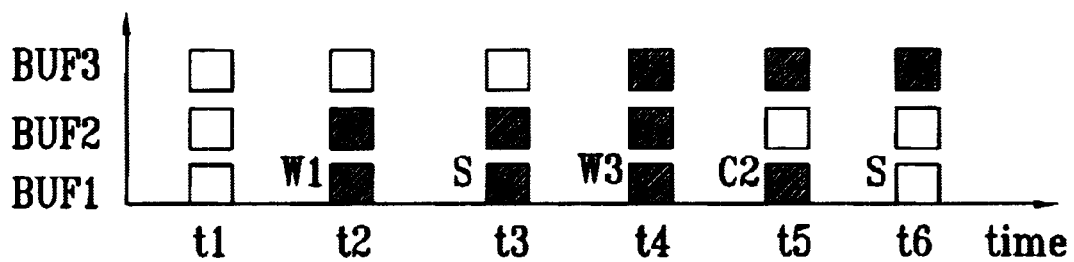
FIG. 4 illustrates sequences of state transitions of a plurality of cache buffers according to an alternate preferred embodiment of the invention.

Referring now to FIG. 4, which depicts the same pattern of buffer access as FIG. 3, except now threads, called cleaners, have been introduced. These cleaners flush old buffers between syncs. They pick the old buffers from the head of the linked list dirtylist. It should be noted that since the dirty buffers are marked with sync numbers, it is simple to distinguish between fresh and old buffers on the linked list dirtylist without resorting to floating point operations. In FIG. 4 at time t1 all three buffers are clean. At time t2 buffers buf1 and buf2 are dirtied. Sync, coming at time t3, does not flush the dirty buffers buf1 and buf2 because they are fresh. At time t4 buffer buf3 becomes dirty. At time t5 a cleaner (indicated by C2) flushes buffer buf2. Buffer buf2 is eligible to be flushed by the cleaner because it is old at time t5, having been skipped by the preceding sync at time t3. At time t6 the next sync arrives and flushes buffer buf1, since it is old. However this sync does not flush the buffer buf3, since it is currently fresh. It will be apparent that the disk load in flushing the buffers buf1 and buf2 has been distributed over two time intervals, t5 and t6, whereas in FIG. 3 both buffers were required to be flushed at time t5.

In embodiment of FIG. 4 it still could happen that a frequently modified buffer is flushed by a cleaner. For example, assume that a buffer became dirty immediately prior to the $i^{th}$ sync. This sync skips the buffer, as it is fresh, but just after the sync finishes, a cleaner may flush the buffer, in an interval period during which it is still being frequently modified. To deal with this drawback, in a first alternate embodiment of the invention cleaners are permitted to execute only if the linked list dirtyList contains sufficiently many buffers.

In a second alternate embodiment of the invention, another situation causing long cache response time is addressed. This occurs if, following a sync, all old buffers have been flushed, and currently running applications together write enough data to dirty all cache buffers. All buffers are now both dirty and fresh. The cache has reverted to a state where any stolen buffer is now required to be flushed, and the cache response time will accordingly be long. To avoid this reversion, in addition to cleaning dirty old buffers, fresh buffers are also cleaned, but only when the overall number of dirty buffers exceeds some threshold. This threshold is preferably dynamically adapted to the current pattern of cache access. If the threshold is too low, more buffers than needed would be cleaned, causing excess disk loading, and adversely affecting overall file system efficiency. On the other hand if the threshold is too high, cache response time would increase due to the need to flush dirty buffers when a new cache buffer needs to be allocated.

While this invention has been explained with reference to the structure disclosed herein, it is not confined to the details set forth and this application is intended to cover any modifications and changes as may come within the scope of the following claims.

What is claimed is:

1. A computer system, comprising a cache memory, and a cache controller operative on said cache memory, a storage device, a computer having computer program instructions stored therein, which instructions cause the computer, cooperative with said cache controller, to execute a method for asynchronous computer disk cache management comprising the steps of:

storing data in available buffers of said cache memory to form clean buffers;

modifying data in said clean buffers to form dirty buffers, defining fresh buffers which were modified subsequent to an occurrence of a predefined event, and further defining old buffers which were modified prior to said occurrence of said event;

executing a sync process to flush said dirty buffers into said storage device to reconstitute said available buffers, wherein said sync process excludes said fresh buffers from said flush;

wherein said predefined event comprises elapse of an interval prior to execution of said sync process; and responsive to a number of said old buffers in said cache memory executing a cleaning process to flush said old buffers into said storage device to reconstitute said available buffers, said cleaning process being executed intermediate successive executions of said sync process while said old buffers exceed a predetermined number.

2. The computer system according to claim 1, wherein said predefined event comprises elapse of said interval prior to execution of said sync process.

3. The computer system according to claim 2, further wherein the method further comprises the steps of varying said interval responsive to usage of said cache memory.

4. The computer system according to claim 2, wherein said interval is measured by sync periods.

5. The computer system according to claim 1, wherein said predefined event comprises failure of said sync process to operate on one of said dirty buffers.

6. The computer system according to claim 1, wherein said old buffers are selected by said cleaning process using a least recently used algorithm to measure usage of said cache memory.

7. The computer system according to claim 1, wherein said cleaning process operates on said fresh buffers when a number of said dirty buffers in said cache memory exceeds a threshold.

8. The computer system according to claim 7, wherein said threshold is dynamically adapted to a current pattern of accessing said cache memory.

9. In a computer disk storage system having one or more storage devices, and a memory cache, a method for asynchronous computer disk cache management comprising the steps of:

storing data in available buffers of a cache memory to form clean buffers;

modifying data in said buffers to form dirty buffers, defining fresh buffers which were modified subsequent to an occurrence of a predefined event, and further defining old buffers that were modified prior to said occurrence of said event;

executing a sync process to flush said dirty buffers into said storage devices to reconstitute said available buffers, wherein said sync process excludes said fresh buffers from said flush; and responsive to a number of said old buffers in said cache memory executing a cleaning process to flush said old buffers into said storage devices to reconstitute said available buffers, said cleaning process being executed intermediate successive executions of said sync process while said old buffers exceed a predetermined number.

10. The method according to claim 9, wherein said predefined event comprises elapse of an interval prior to execution of said sync process.

11. The method according to claim 10, further comprising the step of varying said interval responsive to usage of said cache memory.

12. The method according to claim 10, wherein said interval is measured by sync periods.

13. The method according to claim 9, wherein said predefined event comprises failure of said sync process to operate on one of said dirty buffers.

14. The method according to claim 9, wherein said old buffers are selected by said cleaning process using a least recently used algorithm to measure usage of said cache memory.

15. The method according to claim 9, wherein said cleaning process operates on said fresh buffers when a number of said dirty buffers in said cache memory exceeds a threshold.

16. The method according to claim 15, wherein said threshold is dynamically adapted to a current pattern of accessing said cache memory.

17. A computer software product, comprising a computer-readable medium in which computer program instructions are stored, which instructions, when read by a computer, cause the computer to execute a method for asynchronous computer disk cache management comprising the steps of:

storing data in available buffers of a cache memory to form clean buffers;

modifying data in said clean buffers to form dirty buffers, defining fresh buffers which were modified subsequent to an occurrence of a predefined event, and further defining old buffers which were modified prior to said occurrence of said event; executing a sync process to flush said dirty buffers into storage devices to reconstitute said available buffers, wherein said sync process excludes said fresh buffers from said flush; and responsive to a number of old buffers in said cache memory executing a cleaning process to flush said old buffers into said storage devices to reconstitute said available buffers, said cleaning process being executed intermediate successive executions of said sync process while said old buffers exceed a predetermined number.

18. The computer software product according to claim 17, wherein said predetermined condition comprises elapse of an interval prior to execution of said sync process.

19. The computer software product according to claim 18, wherein the method further comprises the steps of varying said interval responsive to usage of said cache memory.

20. The computer software product according to claim 18, wherein said interval is measured by sync periods.

21. The computer software product according to claim 17, wherein said predefined event comprises failure of said sync process to operate on one of said dirty buffers.

22. The computer software product according to claim 17, wherein said old buffers are selected by said cleaning process using a least recently used algorithm to measure usage of said cache memory.

23. The computer software product according to claim 17, wherein said cleaning process operates on fresh buffers when a number of dirty buffers in said cache memory exceeds a threshold.

24. The computer software product according to claim 23, wherein said threshold is dynamically adapted to a current pattern of accessing said cache memory.

* * * * *